(12) United States Patent
Christ

(10) Patent No.: US 10,600,162 B2
(45) Date of Patent: Mar. 24, 2020

(54) METHOD AND SYSTEM TO COMPENSATE FOR BIDIRECTIONAL REFLECTANCE DISTRIBUTION FUNCTION (BRDF)

(71) Applicant: Konica Minolta Laboratory U.S.A., Inc., San Mateo, CA (US)

(72) Inventor: John Randall Christ, Santa Clara, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 273 days.

(21) Appl. No.: 15/846,643

(22) Filed: Dec. 19, 2017

(65) Prior Publication Data

US 2018/0189936 A1  Jul. 5, 2018

Related U.S. Application Data

(60) Provisional application No. 62/440,110, filed on Dec. 29, 2016.

(51) Int. Cl.
*G06T 5/00* (2006.01)
*G06T 3/40* (2006.01)

(52) U.S. Cl.
CPC ............ *G06T 5/008* (2013.01); *G06T 3/4007* (2013.01); *G06T 3/4076* (2013.01); *G06T 2207/10032* (2013.01); *G06T 2207/30188* (2013.01)

(58) Field of Classification Search
None
See application file for complete search history.

(56) References Cited

U.S. PATENT DOCUMENTS

| 5,637,873 | A | 6/1997 | Davis et al. | |
| 7,068,816 | B1 * | 6/2006 | Knoblauch | A01B 79/005 348/144 |
| 7,242,803 | B2 * | 7/2007 | Miller | G01W 1/00 382/173 |
| 7,369,229 | B2 | 5/2008 | Bissett, III et al. | |

(Continued)

OTHER PUBLICATIONS

Michael J. Smith, "A Comparison of DG AComp, FLAASH and QUAC Atmospheric Compensation Algorithms Using WorldView-2 Imagery", Department of Civil Enoineenng Master's Report, University of Colorado, Spring 2015.

*Primary Examiner* — Anand P Bhatnagar
(74) *Attorney, Agent, or Firm* — Buchanan Ingersoll & Rooney PC

(57) ABSTRACT

A method, a computer program product, and a system are disclosed to compensate for bidirectional reflectance distribution function (BRDF). The method including selecting an area of a landscape to be imaged; obtaining a plurality of aerial images of the selected area from a sensor or camera, wherein each of the plurality of aerial images comprises a plurality of pixels; combining the plurality of pixels from each of the plurality of images to form a plurality of superpixels, each of the plurality of superpixels comprising the plurality of pixels from one or more of the plurality of aerial images, and wherein each of the superpixels has a same resolution; combining the plurality of the superpixels into a single image, which simulates a satellite image; and performing a BRDF correction on one more of the obtained aerial images to adjust and/or change an intensity of the plurality of pixels.

20 Claims, 6 Drawing Sheets

(56) References Cited

U.S. PATENT DOCUMENTS

| | | | |
|---|---|---|---|
| 7,756,356 B2* | 7/2010 | Pfister | H04N 5/262 |
| | | | 382/174 |
| 7,929,142 B2 | 4/2011 | Ben-Ezra et al. | |
| 7,944,561 B2 | 5/2011 | Nisper et al. | |
| 8,493,432 B2 | 7/2013 | Taguchi et al. | |
| 9,576,349 B2* | 2/2017 | Omer | G06T 5/008 |
| 9,710,721 B2* | 7/2017 | Ardouin | G06K 9/46 |
| 2003/0133121 A1 | 7/2003 | Davis et al. | |
| 2004/0252587 A1* | 12/2004 | Melese | A61B 5/0071 |
| | | | 367/149 |
| 2007/0026841 A1 | 2/2007 | DeMoor | |
| 2008/0218516 A1* | 9/2008 | Pfister | G06T 11/60 |
| | | | 345/426 |
| 2012/0035884 A1* | 2/2012 | Ingram | G01S 7/411 |
| | | | 702/181 |
| 2012/0154584 A1* | 6/2012 | Omer | G06T 5/008 |
| | | | 348/144 |
| 2013/0071016 A1* | 3/2013 | Omer | G06T 5/008 |
| | | | 382/164 |
| 2014/0012541 A1* | 1/2014 | Ingram, Jr. | G01S 7/411 |
| | | | 702/181 |
| 2014/0112536 A1* | 4/2014 | Ely | G06T 7/32 |
| | | | 382/103 |
| 2019/0258899 A1* | 8/2019 | Coogan | G06K 9/00657 |

\* cited by examiner

METHOD AND SYSTEM TO COMPENSATE FOR BIDIRECTIONAL REFLECTANCE DISTRIBUTION FUNCTION (BRDF)

CROSS-REFERENCES TO RELATED APPLICATIONS

This application claims priority to U.S. Patent Application Ser. No. 62/440,110 filed on Dec. 29, 2016, the entire content of which is incorporated herein by reference.

FIELD

The present application relates to a method and system to compensate for bidirectional reflectance distribution function (BRDF), and more particularly, to a method and system to compensate for bidirectional reflectance distribution function (BRDF) for vegetation and soil imaging from an aerial vehicle using one or more cameras.

BACKGROUND

Aerial vehicles, which can include manned airplanes, rotary type unmanned aerial vehicles (UAV) including helicopters, quadcopters, hexacopters, octocopters, and/or fixed wing UAVs can be used to obtain aerial photographs. However, when sensing remote bare soil, the BRDF values can be noticeable, particularly when sensing from low elevations from UAVs or airplanes.

BRDF defines how light is reflected at an opaque surface and can be calculated by taking an incoming light direction ($\omega_i$), and outgoing direction ($\omega_r$) (taken in a coordinate system where the surface normal (n) lies along the z-axis, and returns the ratio of reflected radiance exiting along the outgoing direction ($\omega_r$) to the irradiance incident on the surface from the incoming light direction ($\omega_i$)). Each direction $\omega$ is itself parameterized by azimuth angle $\phi$ and zenith angle $\theta$, therefore the BRDF as a whole is a function of 4 variables. The BRDF has units $sr^{-1}$, with steradians (sr) being a unit of solid angle.

If the BRDF is not calibrated correctly, the sensed soil information may not be accurate due to the roughness of the soil, tillage method (plowing or cultivation causes ridges in the soil), field terrain, and soil mineral content and texture (sand, loam, clay, or silt). In addition, the same effect can be seen for remote vegetation sensing, depending on crop type, how much soil is showing between the plants, and lighting conditions.

BRDF can also cause remote sensing inaccuracies if not corrected. For example, methods that measure BRDF using measurement of lighted surfaces may not be effective when sensing at UAV or manned airplane elevations because lighting sources powerful enough to light up the ground would draw excessive power from the aerial vehicle or could be a danger to people or animals on the ground.

Known systems use rotating mirrors, multiple sensors and/or measurement of lighted surfaces for BRDF calibration. These methods, however, are not ideal for UAVs since they can add weight, are costly, or have mechanical systems that can fail during operation.

Known systems also describe flight patterns, for example, flying in a circular pattern several times for BRDF calculation. However, this is also not ideal since it performs BRDF calibration for one field location and does not correct BRDF for other parts of the field.

SUMMARY

In consideration of the above issues, it would be desirable to have a method and system to compensate for bidirectional reflectance distribution function (BRDF) for vegetation and soil imaging, which simplifies BRDF calculation by using only a sensor (or camera) with a wide angle lens and has no moving parts, and can be performed with only one pass flight pattern for BRDF calculation and which can correct BRDF for portions of a field with changing lighting conditions caused, for example, by clouds, changing sun angle or other conditions, such as, for example, different types of crops or various terrains. Crops can include, for example, a cultivated plant, a fungus, or an alga that is harvested for food, clothing, livestock, fodder, biofuel, medicine, or other uses. For example, crops can include grains, fruits, or vegetables, such as sugarcane, pumpkin, maize or corn, wheat, rice, cassava, soybeans, hay, potatoes, cotton, and barley.

A method to compensate for bidirectional reflectance distribution function (BRDF), the method comprising: selecting an area of a landscape to be imaged; obtaining a plurality of aerial images of the selected area from a sensor or camera, wherein each of the plurality of aerial images comprises a plurality of pixels; combining the plurality of pixels from each of the plurality of images to form a plurality of superpixels, each of the plurality of superpixels comprising the plurality of pixels from one or more of the plurality of aerial images, and wherein each of the superpixels has a same resolution; combining the plurality of the superpixels into a single image, which simulates a satellite image; performing a BRDF correction on one more of the obtained aerial images to adjust and/or change an intensity of the plurality of pixels, wherein the BRDF correction includes selecting one or more of the plurality of obtained aerial images for the BRDF correction and generating the plurality of superpixels for at least one section of the selected area based on an attribute of the landscape; and applying the BRDF correction to an entirety of the selected area of the landscape, and if striping is visible in the single image, performing an additional BRDF correction to the selected area of the landscape to eliminate the striping in the single image.

A computer program product comprising a non-transitory computer readable medium having a computer readable code embodied therein to compensate for bidirectional reflectance distribution function (BRDF) is disclosed, the computer readable program code configured to execute a process comprising: selecting an area of a landscape to be imaged; obtaining a plurality of aerial images of the selected area from a sensor or camera, wherein each of the plurality of aerial images comprises a plurality of pixels; combining the plurality of pixels from each of the plurality of images to form a plurality of superpixels, each of the plurality of superpixels comprising the plurality of pixels from one or more of the plurality of aerial images, and wherein each of the superpixels has a same resolution; combining the plurality of the superpixels into a single image, which simulates a satellite image; performing a BRDF correction on one more of the obtained aerial images to adjust and/or change an intensity of the plurality of pixels, wherein the BRDF correction includes selecting one or more of the plurality of obtained aerial images for the BRDF correction and generating the plurality of superpixels for at least one section of the selected area based on an attribute of the landscape; and applying the BRDF correction to an entirety of the selected area of the landscape, and if striping is visible in the single image, performing an additional BRDF correction to the selected area of the landscape to eliminate the striping in the single image.

A system is disclosed for generating an image, which compensates for bidirectional reflectance distribution function (BRDF), the system comprising: a plurality of aerial images of a selected area of a landscape obtained from a sensor or camera, wherein each of the plurality of aerial images comprises a plurality of pixels; and a processor configured to: combine the plurality of pixels from each of the plurality of images to form a plurality of superpixels, each of the plurality of superpixels comprising the plurality of pixels from one or more of the plurality of aerial images, and wherein each of the superpixels has a same resolution; combine the plurality of the superpixels into a single image, which simulates a satellite image; perform a BRDF correction on one more of the obtained aerial images to adjust and/or change an intensity of the plurality of pixels, wherein the BRDF correction includes selecting one or more of the plurality of obtained aerial images for the BRDF correction and generating the plurality of superpixels for at least one section of the selected area based on an attribute of the landscape; and apply the BRDF correction to an entirety of the selected area of the landscape, and if striping is visible in the single image, perform an additional BRDF correction to the selected area of the landscape to eliminate the striping in the single image.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Bidirectional Reflectance Distribution Function (BRDF) effect can be greater when capturing high-resolution images from UAV or aircraft. However, the effect of BRDF can be less when images captured from satellites at approximately 30 m/pixel (meters per pixel). In accordance with an exemplary embodiment, to simulate the effect of capturing images from satellite, a method and system is disclosed, which combines multiple pixels from captured images to create 'superpixels' that simulate satellite imagery resolutions. In accordance with an exemplary embodiment, these "superpixel" images can be utilized to estimate BRDF for current terrain or fields, such as a physical feature of the landscape, sunlight conditions including sun angle, and cloudy conditions. In addition, if the terrain or field to be captured is quite variable, the method and system disclosed can be utilized for several portions of the terrain or field. In accordance with an exemplary embodiment, the method and system can be utilized for vegetation or for bare soil remote sensing.

Figure 1:
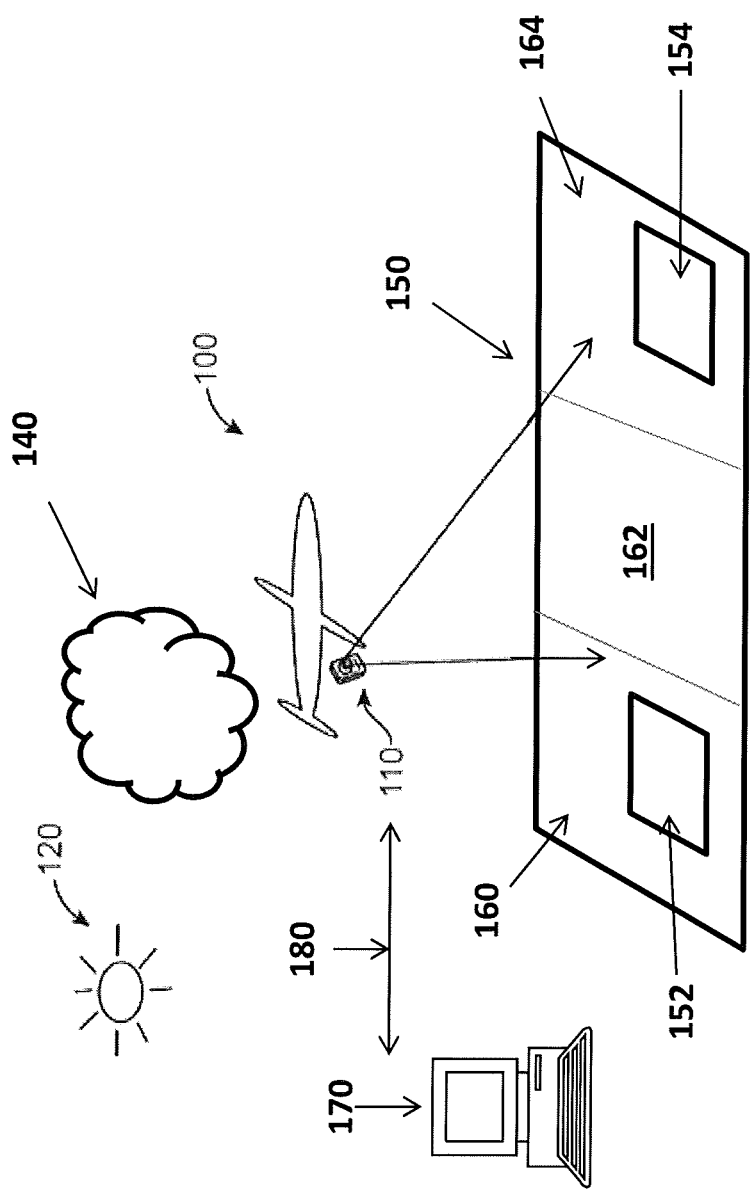
FIG. 1 is an illustration of an aerial vehicle having a sensor or camera, and wherein the sensor or camera captures images in accordance with an exemplary embodiment.

FIG. 1 is an illustration of an aerial vehicle 100 having at least one sensor or camera 110, and wherein the at least one sensor or camera 110 captures aerial images in accordance with an exemplary embodiment. As shown in FIG. 1, the sensor or camera 110 can be attached to the aerial vehicle 100, which can be, for example, an unmanned aerial vehicle (UAV). As described above, it would be desirable to have a method and system to compensate for bidirectional reflectance distribution function (BRDF) for vegetation and soil imaging, which simplifies the BRDF calculation by using only a sensor (or camera) 110 with a wide angle lens and preferably has no moving parts. In accordance with an exemplary embodiment, the method and system as disclosed can be performed with only one (or a single) pass flight pattern for BRDF calculation, and which can correct BRDF for each portion of a field with changing lighting conditions caused by the sun 120, clouds 140, corresponding sun angle and/or other conditions.

In accordance with an exemplary embodiment, the method and system should first determine or decide an area 140 for superpixel generation. In accordance with an exemplary embodiment, a superpixel is a combination of a plurality of pixels (or images) combined into a single image, which simulates satellite imagery resolution. In accordance with an exemplary embodiment, the sensor or camera 110 for an unmanned aerial vehicle (UAV) can be configured to obtain a plurality of aerial images of the selected area, for example, at a height above ground level of 120 meters or less.

For example, if the field 150 is relatively flat, has one crop type, and uniform lighting, one set of superpixel BRDF compensated images will be sufficient for an entire field 150. However, if the field 150 is not relatively flat, for example, having one or more slopes or hills 160, 162, 164, or alternatively, if the field 150 has two or more different crops 152, 154, for example, corn and soybeans, the fields 150 can be grouped by crop type 152, 154, or by topology (or terrain) 160, 162, 164 of the field 150. In accordance with an exemplary embodiment, grouping by crop type 152, 154 can include, if multiple crops 152, 154 are grown on one field 150, the field 150 should be separated accordingly since BRDF can be dependent on crop type. In grouping according to topology of field (or terrain) 160, 162, 164, for example, if the eastern ⅓ of field 160 is relatively flat, the center ⅔ of field 162 is sloped to the west at a 10° angle, and western ⅓ of field 164 is sloped to the east at a 5° angle, a grouping of the field into 3 parts 160, 162, 164 using similar slope characteristics may be desired. In addition, areas of the field 150 containing shadows, for example, from nearby trees, telephone poles, and the like may have to be treated separately.

In accordance with an exemplary embodiment, superpixels at the edges of the field 150 may also need special treatment to avoid mixing in unwanted pixels from surrounding areas such as, for example, neighboring fields, trees, grass, roads, houses, or cattle pens. For example, in accordance with an exemplary embodiment, algorithms used in satellite imagery known as spectral unmixing can be used to address this problem. In accordance with an exemplary embodiment, the method and system as disclosed herein, in the present processing can be more versatile than known systems, since the original pixels are higher resolution and unwanted pixels can be filtered out using pixel duplication or other techniques.

In accordance with an exemplary embodiment, the method and system as disclosed herein, can be processed on a computer system or processing unit 170. The computer system or processing unit 170 is configured to analyze and process data received from the at least one sensor or camera 110. The computer system or processing unit 170 can include a processor or central processing unit (CPU) and one or more memories for storing software programs and data. The processor or CPU carries out the instructions of a computer program, which operates and/or controls at least a portion of the functionality of the computer system or processing unit 170. The computer system or processing unit 170 can also include an input unit, a display unit or graphical user interface (GUI), and a network interface (I/F), which is connected to the network communication (or network) 180. The computer system or processing unit 170 can also include an operating system (OS), which manages the computer hardware and provides common services for efficient execution of various software programs. For example, some embodiments may include additional or fewer computer system or processing unit 170, services, and/or networks, and may implement various functionality locally or remotely on other computing devices 170. Further, various entities may be integrated into to a single computing system or processing unit 170 or distributed across additional computing devices or systems 170.

In accordance with an exemplary embodiment, the communication network 180 may include a conventional type network, wired or wireless, and may have any number of configurations, such as a star configuration, token ring configuration, or other known configurations. The communication network 180 may include one or more local area networks ("LANs"), wide area networks ("WANs") (e.g., the Internet), virtual private networks ("VPNs"), peer-to-peer networks, near-field networks (e.g., Bluetooth™), cellular networks (for example, 3G, 4G, other generations), and/or any other interconnected data path across which multiple computing nodes may communicate.

Figure 2:
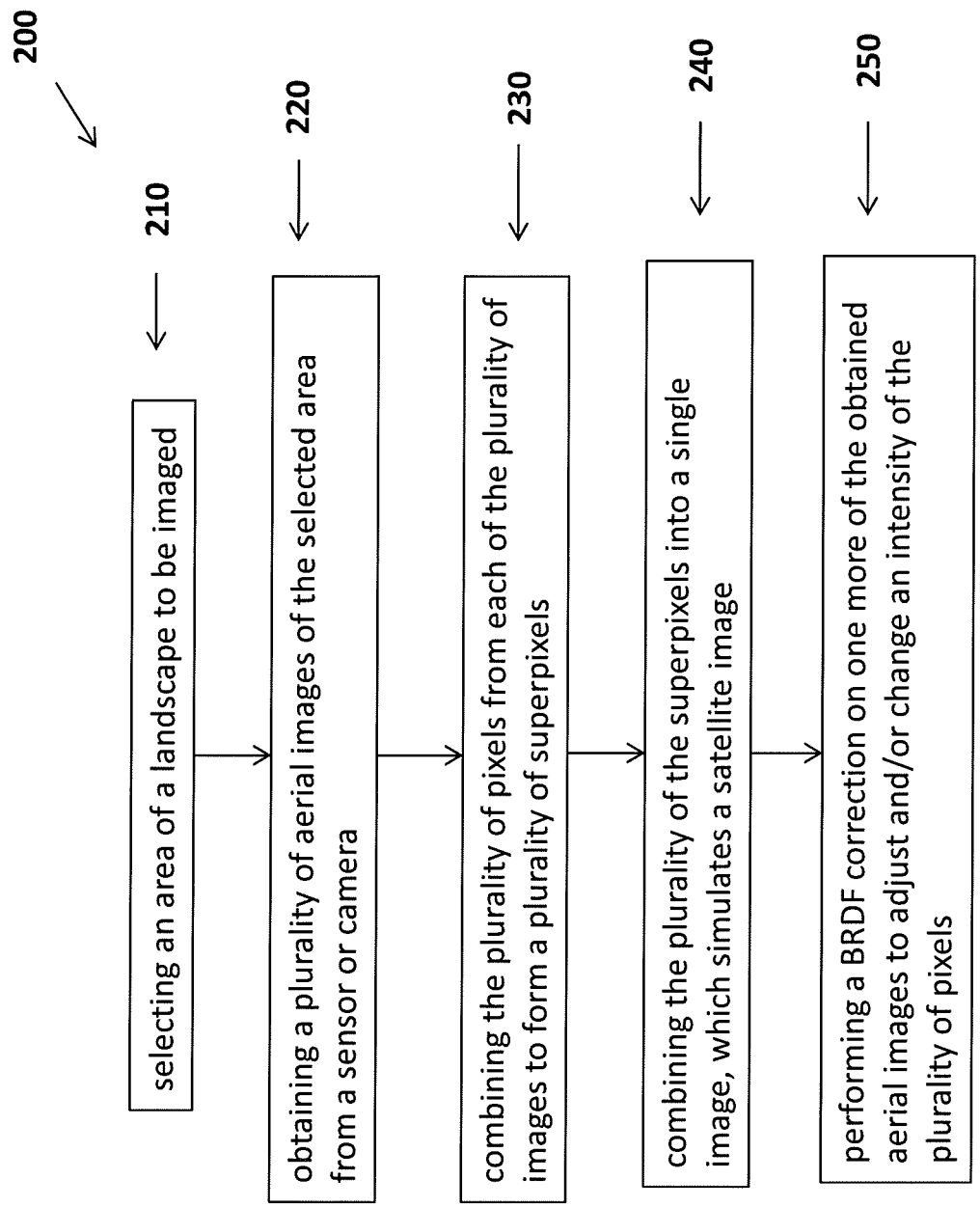
FIG. 2 is a flow chart showing a method and system to compensate for bidirectional reflectance distribution function (BRDF) in accordance with an exemplary embodiment.

FIG. 2 is a flow chart 200 showing a method and system to compensate for bidirectional reflectance distribution function (BRDF) in accordance with an exemplary embodiment. As shown in FIG. 2, in step 210, an area is selected to be imaged removing roads, houses, or other non-crop areas. In step 220, a plurality of aerial images are obtained of the selected area from a sensor or camera, and wherein each of the plurality of aerial images comprises a plurality of pixels. In accordance with an exemplary embodiment, the plurality of aerial images can be obtained, for example, at a height above ground level of 120 meters or less. In step 230, the plurality of pixels from each of the plurality of images are combined to form a plurality of superpixels, each of the plurality of superpixels comprising the plurality of pixels from one or more of the plurality of aerial images, and wherein each of the superpixels has a same resolution. In step 240, the plurality of the superpixels are combined into a single image, which simulates a satellite image. For example, if image resolution is 4 cm/pixel (centimeters per pixel), combine 750×750 pixels into one superpixel with resolution of 30 m/pixel (meters per pixel). If the field is relatively uniform as far as plant type, uniform cloud cover, or uniform sunlight, the method and system can utilize superpixels from one portion of the field for the entire field, which can help reduce computational power and time required for processing.

However, in accordance with an exemplary embodiment, in step 250, BRDF correction for one or more of the aerial images and corresponding pixels may be need. For example, in accordance with an exemplary embodiment, a field 150 may need to be divided into sections for an agricultural field, for example, a flat portion, a hilly portion slanted east, a hilly portion slanted west, and a shaded portion. In accordance with an exemplary embodiment, BRDF compensation can be calculated separately for each section. For example, known BRDF correction applications and/or processes can be used for the BRDF corrections, such that each of the sections has a relatively uniform intensity, for example, the intensity among each of the sections is relatively consistent or equal.

In accordance with an exemplary embodiment, for example, the number of field sections can be determined before image processing starts based on terrain or crop differences. For example, if half of the field is planted in corn and the other half is planted in soybeans, different BRDF correction factors can be utilized for each half of the field. In addition, although the field terrain does not change, processing can be different depending on flight direction. In accordance with an exemplary embodiment, one of the goals of the different BRDF correction factors is to produce superpixels having a relatively uniform intensity, which is consist, to reduce the striping in the image 300 as shown, for example, in FIG. 3.

In accordance with an exemplary embodiment, for example, in cases where crop is variable with different growth levels at different areas of the field or a field that is very variable, it may be necessary to use separate BRDF corrections for each of the areas (or sections) of the field for maximum accuracy.

Figure 3:
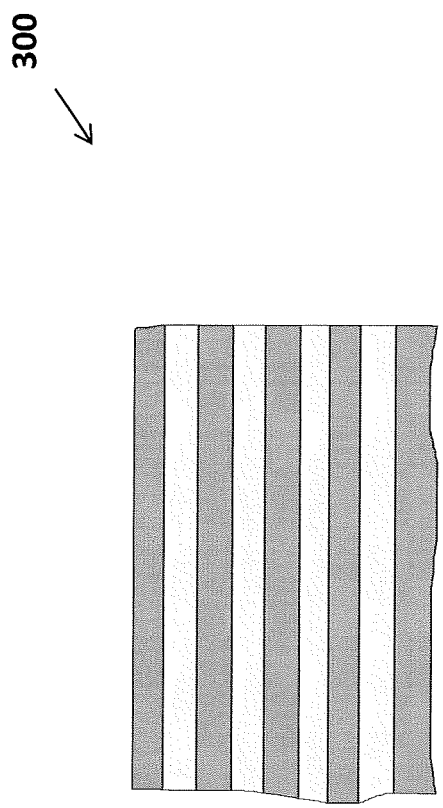
FIG. 3 is an illustration of an image without BRDF correction with visible striping.

In accordance with an exemplary embodiment, to determine how BRDF correction is performing, first generate superpixels for one side of the field and utilize the generated superpixels for the BRDF correction for the field. If results are unsatisfactory, for example, with striping visible in the image 300 as shown in FIG. 3, additional BRDF correction may be needed. For example, in accordance with an exemplary embodiment, prior knowledge of the field can be used to assist with the BRDF correction based on field terrain and crop type. In addition, field sections that were utilized previously can be used as a guide, however, if the crop has grown or dried since the last imaging occurred, the area or number of field divisions for BRDF correction may need to be adjusted.

In accordance with an exemplary embodiment, the overlapping areas between flight path images can also be used to calculate BRDF since these areas are imaging the same topology from different angles. Therefore, many similarities can be inferred between the two portions of these images such as terrain slope, plant cover (if any) or soil type and color, sun angle, cloud positioning, and shadows from nearby objects.

In accordance with an exemplary embodiment, a consumer camera 110, for example, a Canon Powershot® SX260 HS can be used with the lens in the wide position, and the aerial vehicle is imaging from a height of 100 m (meters) AGL (i.e., height above ground level). The Ground Sample Distance (GSD) can be for example, 5 cm/pixel or less, and in this case is approximately 4.3 cm/pixel, and the image size on the ground is approximately 137×103 m with the camera taking images in the large 4:3 mode with image size of 4000×3000 pixels.

Figure 4:
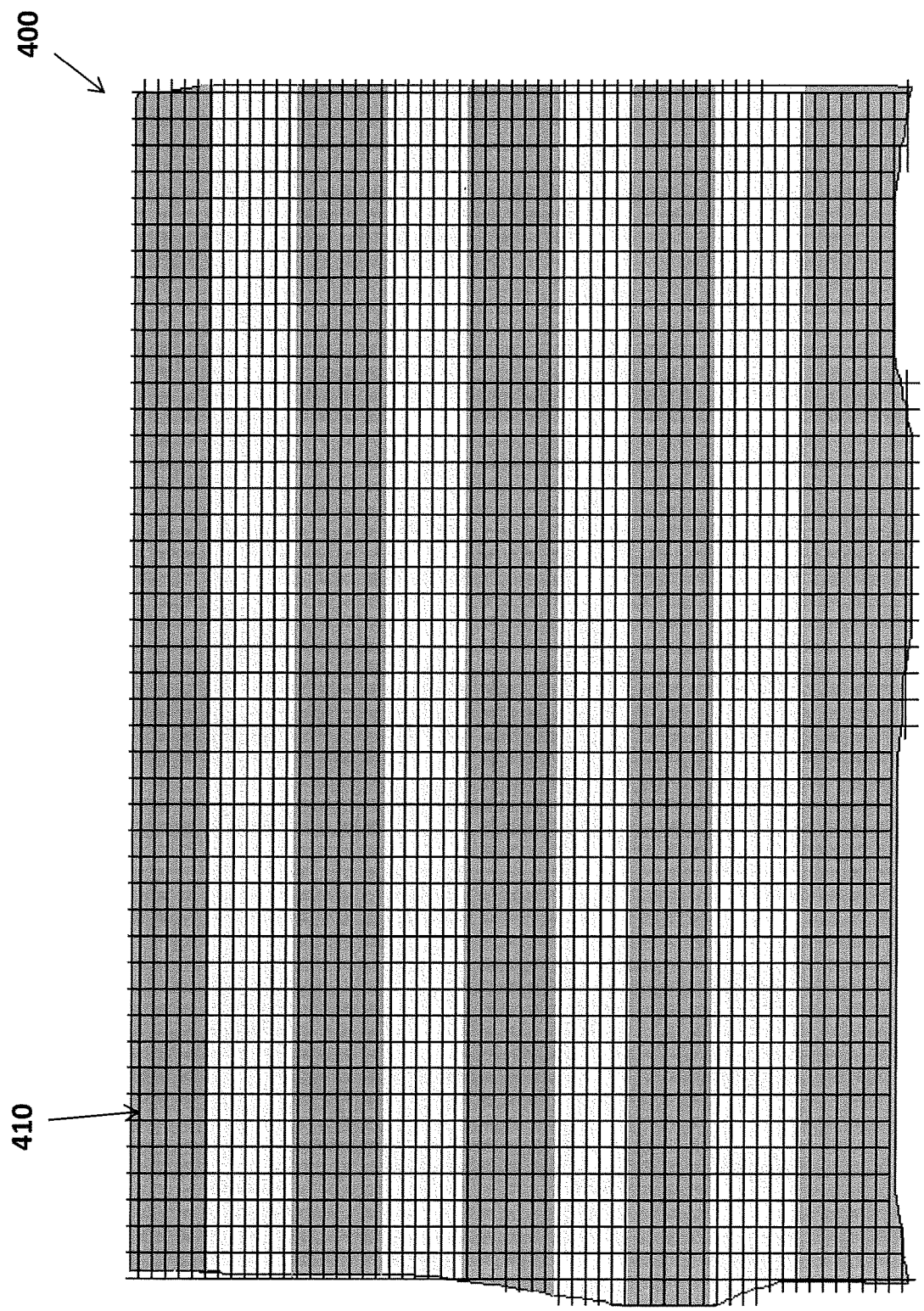
FIG. 4 is an illustration showing a diagram having, for example, 30 m/pixel resolution superpixel locations in accordance with an exemplary embodiment with visible striping.

FIG. 4 is an illustration showing a diagram 400 having 30 m/pixel resolution superpixel locations 410 in accordance with an exemplary embodiment with visible striping. For example, in accordance with an exemplary embodiment, to create superpixels of the same resolution of satellites at about 30 m/pixel, 750×750 pixels can be combined to create one superpixel. For example, this can be performed using a variety of image downsampling methods such as bicubic interpolation, bilinear interpolation or nearest neighbor interpolation. An averaging algorithm followed by a blur convolution may be used to best simulate the lower resolution satellite pixels. In accordance with an exemplary embodiment, in this case, sharp edges are not the desired result, but simulation of the pixels captured by the satellite.

In accordance with an exemplary embodiment, for example, only sections of images close to edges or overlapping areas between passes of aerial vehicle are used to reduce amount of superpixel generation. For example, this method would allow same physical location or nearby locations to be used for BRDF correction, which can improve accuracy and reduce computational cost.

In addition, previous sections of field can be used as a guide to determine grouping of the field for similarities for superpixel generation, and add any cloud shadowing or other differences detected during current imaging session such as farm equipment location or other shadowing.

Figure 5:
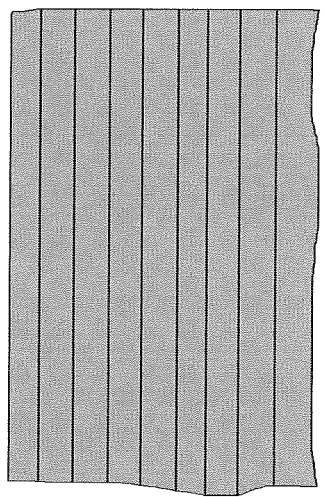
FIG. 5 is an illustration of an image with BRDF correction in accordance with an exemplary embodiment in which the visible striping has been eliminated.

FIG. 5 is an illustration of an image 500 with BRDF correction in accordance with an exemplary embodiment in which the visible striping has been eliminated, which can be used, for example, for monitoring the landscape for growth of plants and/or vegetation in an agricultural field.

Figure 6:
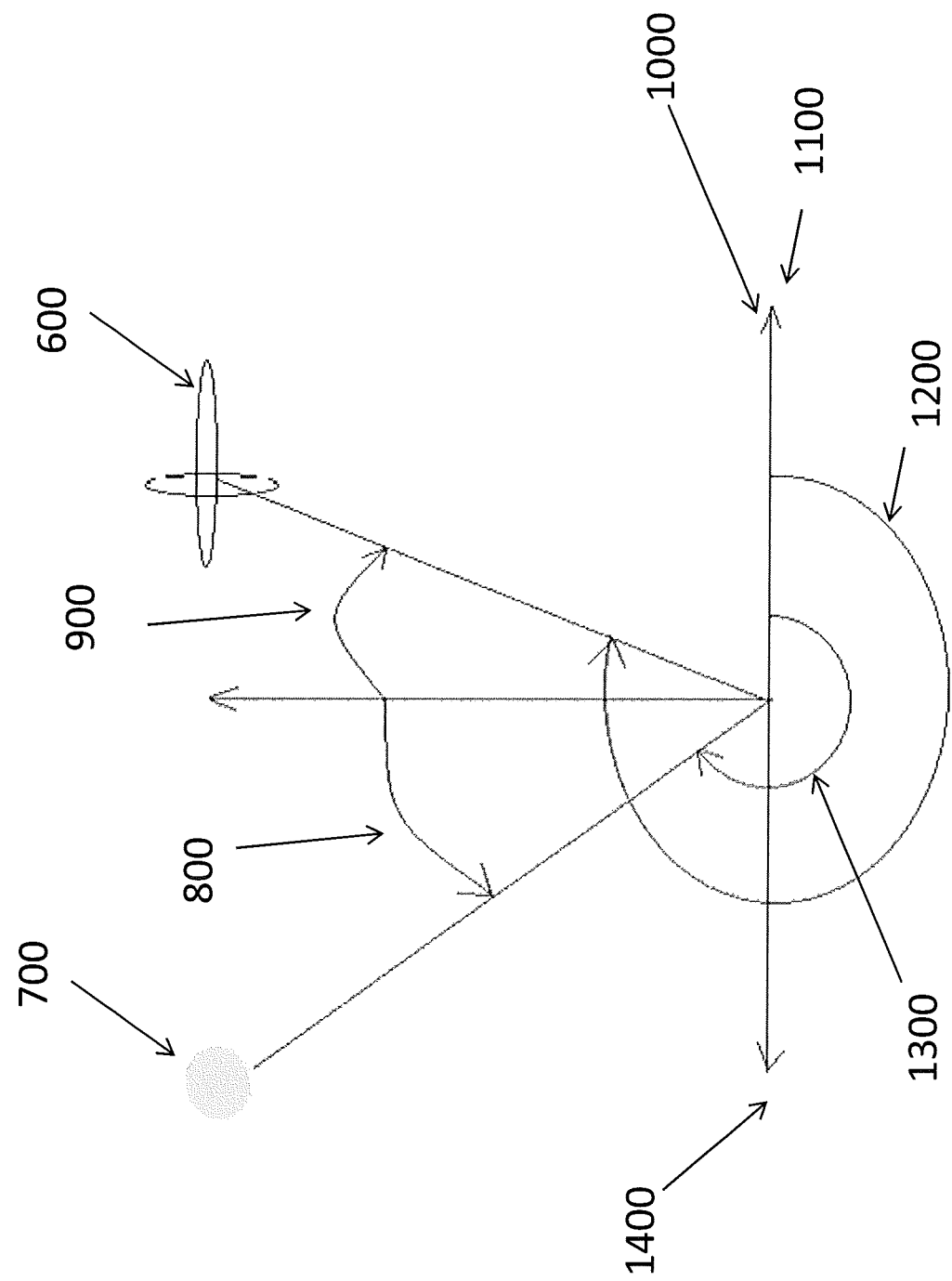
FIG. 6 is an illustration showing angles for BRDF formulas in accordance with an exemplary embodiment.

FIG. 6 is an illustration showing angles for BRDF formulas in accordance with an exemplary embodiment. As shown in FIG. 6, the BRDF reflectance and illumination angles for an aerial vehicle 600 can include an illumination source from sun 700, $\theta_i$=illumination zenith angle 800, $\theta_r$=reflectance at sensor zenith angle 900, True North 1000, azimuth angle $\phi$=0° 1100, $\phi_r$=reflectance at sensor azimuth angle 1200, $\phi_i$=illumination azimuth angle 1300, and azimuth angle for South $\phi$=180° 1400.

In accordance with an exemplary embodiment, the formula for BRDF can be:

$$f_r(\theta_i, \phi_i; \theta_r, \phi_r; \lambda) = \frac{dL_r(\theta_r, \phi_r)}{dE(\theta_i, \phi_i)}$$

Where $L_r$ is the surface leaving spectral radiance $$\left[\frac{W}{m^2 sr \mu m}\right]$$

and
E is the spectral irradiance $$\left[\frac{W}{m^2 \mu m}\right]$$

which results in BRDF having units of $sr^{-1}$.
sr=steradians (radians squared).

$W/(m^2 \mu m)$—light intensity at a point with light frequency specified in $\mu m$.
$\lambda$—wavelength of light incident and reflected from an object.
$\theta_r$ and $\phi_r$—zenith and azimuth angles of reflectance
$\theta_i$ and $\phi_i$—zenith and azimuth angles of illumination angle $\theta$ is measured from nadir or vertical direction.
Azimuth angle $\phi$ is measured clockwise in horizontal plane from True North.

In accordance with an exemplary embodiment, the BRDF correction formula can be:

$$\rho(\theta_i, \theta_r, \phi) = a\theta_i^2\theta_r^2 + b(\theta_i^2 + \theta_r^2) + c\theta_i\theta_r \cos \phi + dD + e$$

Where
$\rho$=reflectance factor
$\theta_i$=illumination from sun zenith angle
$\theta_r$=reflection at sensor zenith angle
$\phi$=relative azimuth angle
D=hot spot term shown below
a, b, c, d, e=free parameters $$D = \sqrt{\tan^2\theta_i + \tan^2\theta_r - 2\tan\theta_i\tan\theta_r\cos\phi}$$

In accordance with an exemplary embodiment, values for free parameters a, b, c, d, and e can be obtained from the image.

In accordance with an exemplary embodiment, the column average of the entire image can be used for this purpose, using the averages from a line scanner imager, representing a line of relatively constant view or reflectance angle and sun or illumination relative azimuth and zenith angles for each aerial vehicle pass if the aerial vehicle flies at a relatively stable pitch, roll and yaw angle during imaging. Hot spot refers to the phenomenon of brighter pixels intensity in the area of the image when the angle between illumination and reflectance is close to perpendicular. For example, this effect can be more noticeable when imaging shiny objects such as green corn leaves.

In accordance with an exemplary embodiment, for example, when capturing still images with an area sensor at low altitudes, obtaining constant reflectance azimuth and zenith angles and constant illumination relative azimuth and zenith angle must use the aerial vehicle pitch, roll and yaw angles variations during flight. In accordance with an exemplary embodiment, simply using the center row of pixels will not result in a constant reflection angle and illumination relative azimuth and zenith angles, and most of the image will not be used for BRDF correction. Thus, the angle of the camera from the ground based on knowledge of aerial vehicle pitch, roll and yaw, angle of gimbal mount for the camera sensor if used, and aerial vehicle heading can be used to determine the correct pixels to use for each image corresponding to the same sun relative azimuth and zenith angles, and the same view angle as the previous image. In accordance with an exemplary embodiment, these pixels are then averaged to get a normalized average result. In accordance with an exemplary embodiment, superpixels generated using methods disclosed herein can be utilized for this purpose, for example, taken from the area of the image corresponding to similar reflectance angles and illumination relative azimuth and zenith angles for each image.

In accordance with an exemplary embodiment, a computer program product comprising a non-transitory computer readable medium having a computer readable code embodied therein to compensate for bidirectional reflectance distribution function (BRDF) is disclosed, the computer readable program code configured to execute a process comprising: selecting an area of a landscape to be imaged;

obtaining a plurality of aerial images of the selected area from a sensor or camera, wherein each of the plurality of aerial images comprises a plurality of pixels; combining the plurality of pixels from each of the plurality of images to form a plurality of superpixels, each of the plurality of superpixels comprising the plurality of pixels from one or more of the plurality of aerial images, and wherein each of the superpixels has a same resolution; combining the plurality of the superpixels into a single image, which simulates a satellite image; performing a BRDF correction on one more of the obtained aerial images to adjust and/or change an intensity of the plurality of pixels, wherein the BRDF correction includes selecting one or more of the plurality of obtained aerial images for the BRDF correction and generating the plurality of superpixels for at least one section of the selected area based on an attribute of the landscape; and applying the BRDF correction to an entirety of the selected area of the landscape, and if striping is visible in the single image, performing an additional BRDF correction to the selected area of the landscape to eliminate the striping in the single image.

The non-transitory computer usable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

The present invention includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to".

In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure.

In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A method to compensate for bidirectional reflectance distribution function (BRDF), the method comprising:
    selecting an area of a landscape to be imaged;
    obtaining a plurality of aerial images of the selected area from a sensor or camera, wherein each of the plurality of aerial images comprises a plurality of pixels;
    combining the plurality of pixels from each of the plurality of images to form a plurality of superpixels, each of the plurality of superpixels comprising the plurality of pixels from one or more of the plurality of aerial images, and wherein each of the superpixels has a same resolution;
    combining the plurality of the superpixels into a single image, which simulates a satellite image;
    performing a BRDF correction on one more of the obtained aerial images to adjust and/or change an intensity of the plurality of pixels, wherein the BRDF correction includes selecting one or more of the plurality of obtained aerial images for the BRDF correction and generating the plurality of superpixels for at least one section of the selected area based on an attribute of the landscape; and
    applying the BRDF correction to an entirety of the selected area of the landscape, and if striping is visible in the single image, performing an additional BRDF correction to the selected area of the landscape to eliminate the striping in the single image.

2. The method of claim 1, wherein the attribute of the landscape is a crop and/or a physical feature or terrain of the landscape.

3. The method of claim 1, wherein the attribute of the landscape is at least one crop; and
    using a separate BRDF correction for the at least one crop having different growth levels at different areas of a field.

4. The method of claim 1, wherein each of the plurality of pixels from plurality of images has a resolution of approximately 5 cm/pixel or less, and each of the plurality of superpixels has a resolution of approximately 30 m/pixel.

5. The method of claim 1, comprising:
    generating the single image by a downsampling method, the downsampling method being selected from a bicubic interpolation, a bilinear interpolation, or a nearest neighbor interpolation.

6. The method of claim 1, comprising:
    removing roads, houses, and/or other non-crop areas from the area of the landscape selected to be imaged.

7. The method of claim 1, comprising:
    monitoring the landscape for growth of plants and/or vegetation in an agricultural field.

8. The method of claim 1, comprising:
    obtaining the plurality of aerial images at a height above ground level of 120 meters or less.

9. A computer program product comprising a non-transitory computer readable medium having a computer readable code embodied therein to compensate for bidirectional reflectance distribution function (BRDF), the computer readable program code configured to execute a process comprising:
    selecting an area of a landscape to be imaged;
    obtaining a plurality of aerial images of the selected area from a sensor or camera, wherein each of the plurality of aerial images comprises a plurality of pixels;

combining the plurality of pixels from each of the plurality of images to form a plurality of superpixels, each of the plurality of superpixels comprising the plurality of pixels from one or more of the plurality of aerial images, and wherein each of the superpixels has a same resolution;

combining the plurality of the superpixels into a single image, which simulates a satellite image;

performing a BRDF correction on one more of the obtained aerial images to adjust and/or change an intensity of the plurality of pixels, wherein the BRDF correction includes selecting one or more of the plurality of obtained aerial images for the BRDF correction and generating the plurality of superpixels for at least one section of the selected area based on an attribute of the landscape; and applying the BRDF correction to an entirety of the selected area of the landscape, and if striping is visible in the single image, performing an additional BRDF correction to the selected area of the landscape to eliminate the striping in the single image.

10. The computer readable medium of claim 9, wherein the attribute of the landscape is a crop and/or a physical feature or terrain of the landscape.

11. The computer readable medium of claim 9, wherein the attribute of the landscape is at least one crop; and using a separate BRDF correction for the at least one crop having different growth levels at different areas of a field.

12. The computer readable medium of claim 9, wherein each of the plurality of pixels from plurality of images has a resolution of approximately 5 cm/pixel or less, and each of the plurality of superpixels has a resolution of approximately 30 m/pixel.

13. The computer readable medium of claim 9, comprising:

generating the single image by a downsampling method, the downsampling method being selected from a bicubic interpolation, a bilinear interpolation, or a nearest neighbor interpolation.

14. The computer readable medium of claim 9, comprising:

removing roads, houses, and/or other non-crop areas from the area of the landscape selected to be imaged.

15. The computer readable medium of claim 9, comprising:

monitoring the landscape for growth of plants and/or vegetation in an agricultural field.

16. The computer readable medium of claim 9, comprising:

obtaining the plurality of aerial images at a height above ground level of 120 meters or less.

17. A system for generating an image, which compensates for bidirectional reflectance distribution function (BRDF), the system comprising:

a plurality of aerial images of a selected area of a landscape obtained from a sensor or camera, wherein each of the plurality of aerial images comprises a plurality of pixels; and a processor configured to:

combine the plurality of pixels from each of the plurality of images to form a plurality of superpixels, each of the plurality of superpixels comprising the plurality of pixels from one or more of the plurality of aerial images, and wherein each of the superpixels has a same resolution;

combine the plurality of the superpixels into a single image, which simulates a satellite image;

perform a BRDF correction on one more of the obtained aerial images to adjust and/or change an intensity of the plurality of pixels, wherein the BRDF correction includes selecting one or more of the plurality of obtained aerial images for the BRDF correction and generating the plurality of superpixels for at least one section of the selected area based on an attribute of the landscape; and apply the BRDF correction to an entirety of the selected area of the landscape, and if striping is visible in the single image, perform an additional BRDF correction to the selected area of the landscape to eliminate the striping in the single image.

18. The system of claim 17, wherein the attribute of the landscape is a crop and/or a physical feature or terrain of the landscape;

wherein the plurality of aerial images are obtained from an aerial vehicle flying at a height above ground level of 120 meters or less; and wherein each of the plurality of pixels from plurality of images has a resolution of approximately 5 cm/pixel or less, and each of the plurality of superpixels has a resolution of approximately 30 m/pixel.

19. The system of claim 17, wherein the attribute of the landscape is at least one crop, and the processor is configured to:

use a separate BRDF correction for the at least one crop having different growth levels at different areas of a field.

20. The system of claim 17, wherein the processor is configured to:

generate the single image by a downsampling method, the downsampling method being selected from a bicubic interpolation, a bilinear interpolation, or a nearest neighbor interpolation.

* * * * *